(12) United States Patent
Nakatsuka

(10) Patent No.: US 7,805,458 B2
(45) Date of Patent: Sep. 28, 2010

(54) CELLULAR PHONE AND MAIL SECURITY PROCESSING METHOD

(75) Inventor: Yuichiro Nakatsuka, Kanagawa (JP)

(73) Assignee: NEC Corporation, Tokyo (JP)

( * ) Notice: Subject to any disclaimer, the term of this patent is extended or adjusted under 35 U.S.C. 154(b) by 1054 days.

(21) Appl. No.: 10/951,652

(22) Filed: Sep. 29, 2004

(65) Prior Publication Data

US 2005/0043016 A1 Feb. 24, 2005

(30) Foreign Application Priority Data

Oct. 3, 2003 (JP) .............................. 2003-346257

(51) Int. Cl.
*G06F 7/00* (2006.01)
*G06F 17/30* (2006.01)
*G06F 3/00* (2006.01)
*G06F 7/04* (2006.01)
*G06F 12/00* (2006.01)
*G06F 12/14* (2006.01)
*G06F 13/00* (2006.01)
*G11C 7/00* (2006.01)

(52) U.S. Cl. .......................... 707/786; 715/752; 726/21
(58) Field of Classification Search ....................... None
See application file for complete search history.

(56) References Cited

U.S. PATENT DOCUMENTS

| 6,148,403 | A  | * | 11/2000 | Haneda et al. ................. 726/19 |
| 6,519,471 | B1 |   | 2/2003  | Yamaguchi |
| 2002/0032750 | A1 | * | 3/2002 | Kanefsky .................... 709/218 |
| 2002/0143885 | A1 | * | 10/2002 | Ross, Jr. .................... 709/207 |
| 2003/0023725 | A1 | * | 1/2003 | Bradfield et al. ............ 709/225 |
| 2003/0135572 | A1 |   | 7/2003  | Katada |
| 2003/0231207 | A1 | * | 12/2003 | Huang ........................ 345/752 |
| 2004/0170261 | A1 | * | 9/2004  | Baker ..................... 379/114.01 |

(Continued)

FOREIGN PATENT DOCUMENTS

JP 2002-149570 A 5/2002

(Continued)

OTHER PUBLICATIONS

Staff Promotion, "Protect your cell phone through skillful use of security functions!", iMODE FaN, Nov. 20, 2002, p. 120, vol. 9, No. 32, Mainichi Communications, Japan.

(Continued)

*Primary Examiner*—Charles Rones
*Assistant Examiner*—Harold A Hotelling
(74) *Attorney, Agent, or Firm*—Sughrue Mion, PLLC

(57) ABSTRACT

Methods and apparatuses consistent with the present invention relate to a cellular phone having a mailing function and a mail security processing method for the same. The user inputs a secret number and then selects a mail folder to display a security setting/releasing mail folder list. When the user selects a mail folder, the security processing is executed for the mail folder. The folder is not shown in an ordinary mail folder list. To release the setting of security implemented by the security processing, the user displays the security setting/releasing screen, inputs a secret number, and selects a mail folder. In a security setting/releasing mail folder list, the mail folder for which the security processing has been executed is displayed. The user selects the folder, and as a result, the setting of security is released.

1 Claim, 4 Drawing Sheets

U.S. PATENT DOCUMENTS

2004/0230663 A1 * 11/2004 Ackerman .................. 709/207

FOREIGN PATENT DOCUMENTS

JP 2002-373140 A 12/2002

OTHER PUBLICATIONS

Hiroshi Nakamura et al., "Find files more easily", Click, Aug. 8 2003, pp. 54-59, vol. 10, No. 8, Nikkei BP-Sha, Japan.

Masaki Matsuda, Camera or application? Taking a core perspective—The inside story! 504i/25li, iMode fan, Aug. 20 2002, pp. 36-39, vol. 9, No. 24, Nikkei Communications; Japan.

* cited by examiner

F I G. 2A

```
SECURITY SETTING·RELEASING

SECRET NUMBER ?
         * * * *

RECEIVED MAIL FOLDER

TRANSMISSION MAIL FOLDER
```

F I G. 2B

```
SECURITY SETTING·RELEASING
RECEIVED MAIL FOLDER LIST (1/1)

□ FOLDER 1
   □ FOLDER 2
   □ FOLDER 3
   □ FOLDER 4
   □ FOLDER 5
   □ FOLDER 6
```

SET SECURITY TO FOLDER 5

F I G. 2C

```
SECURITY SETTING·RELEASING
RECEIVED MAIL FOLDER LIST (1/1)

□ FOLDER 1
   □ FOLDER 2
   □ FOLDER 3
   □ FOLDER 4
   □ FOLDER 5   *
   □ FOLDER 6
```

F I G. 2D

```
RECEIVED MAIL FOLDER LIST (1/1)

□ FOLDER 1
   □ FOLDER 2
   □ FOLDER 3
   □ FOLDER 4
   □ FOLDER 6
```

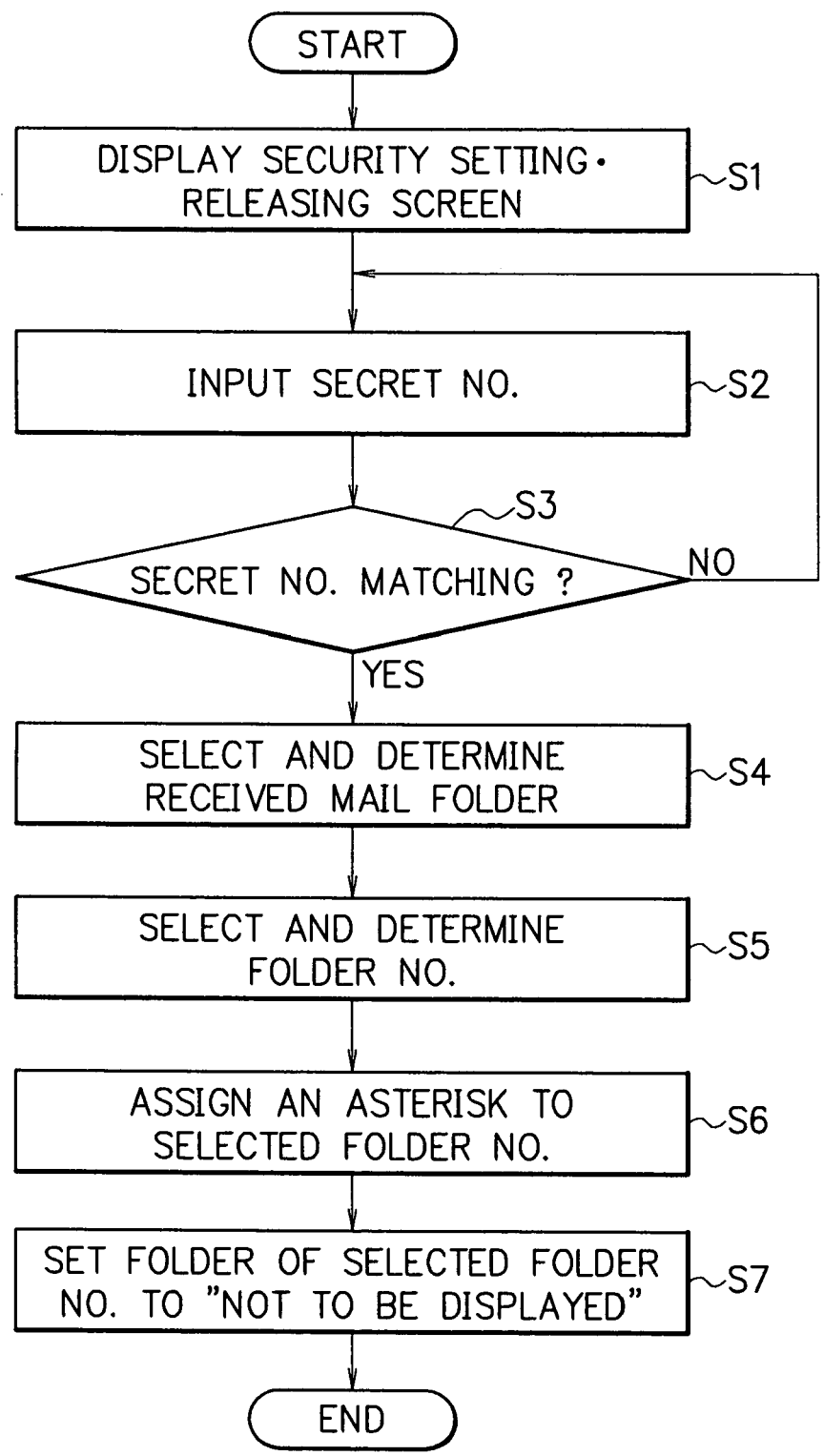

CELLULAR PHONE AND MAIL SECURITY PROCESSING METHOD

BACKGROUND OF THE INVENTION

1. Field of the Invention

The present invention relates to a cellular phone and a mail security processing method for the same, and in particular, to a cellular phone and a mail security processing method for the same of guaranteeing security of transmission mail and received mail.

2. Description of the Prior Art

Cellular phones have been widely developed and spread these days and hence have been used to communicate pieces of mail. The mail includes business mail and private mail. It is desired that some pieces of mail are not read or accessed by a third party.

Japanese Patent Application laid open No. 2002-149570 and No. 2002-373140 describe conventional techniques to prevent a third party from reading a predetermined piece of mail.

According to Japanese Patent Application laid open No. 2002-149570 entitled "Cellular Phone and Mail Display Control Method", mail is classified into mail with lock (not to be read by a third party) and mail without lock according to specifications from the user. Utilizing a secret number, a piece of mail is stored. The piece of mail thus locked is unlocked or released using the secret number. The pieces of mail with lock and those without lock are both displayed.

According to Japanese Patent Application laid open No. 2002-373140 entitled "Cellular Phone", mail desired not to be read by a third party is set as secret mail. The secret mail is not displayed in a list, and any piece of mail obtained from a specified mail address can be set as secret mail.

However, according to Japanese Patent Application laid open No. 2002-149570, the mail with lock and that without lock are both displayed. If a third party intentionally views the mail stored in the cellular phone, the third party possibly becomes offended because the mail with lock exists therein. In operation, the user specifies each piece of mail for mail with lock or for mail without lock.

According to Japanese Patent Application laid open No. 2002-373140, some pieces of mail associated with a predetermined mail address can be set as secret mail at a time. However, ordinarily, each piece of mail is specified for secret mail to be saved in the system.

SUMMARY OF THE INVENTION

It is therefore an object of the present invention, which has been devised in consideration of the problems, to provide a cellular phone and a mail security processing method for the same in which security is set in groups of folders so that such folders are not shown or are concealed on the display to guarantee protection of privacy.

In accordance with a first aspect of the present invention, there is provided to achieve the object a cellular phone having a mailing function. The cellular phone includes a plurality of transmission mail folders for saving transmission mail including a piece of mail which has not been transmitted yet, a plurality of received mail folders for saving received mail, a security setting/releasing unit for a user to select whether an object to which security is set is one of the transmission mail folders or one of the received mail folders or to select whether an object from which setting of security beforehand set thereto is released or canceled is one of the transmission mail folders or one of the received mail folders, a security setting/releasing folder list display unit for displaying all folders contained in the transmission or received mail folders selected by the security setting/releasing unit, a security setting/releasing folder selecting unit in which at least one of the folders displayed by the security setting/releasing folder list display unit is selected by the user and is set as a security setting objective folder or as a security releasing objective folder, and a folder list display unit for displaying the transmission mail folders or the received mail folders in the form of a list. In the cellular phone, a mark is assigned to the folder selected for the security setting by the security setting/releasing folder selecting unit and the folder is displayed by the security setting/releasing folder list display unit and is not displayed by the folder list display unit. In the cellular phone, a mark is removed from the folder selected for the security releasing by the security setting/releasing folder selecting unit and the folder is displayed by the security setting/releasing folder list display unit and the folder list display unit.

In accordance with a second aspect of the present invention, in the cellular phone, even when a transmission or received mail folder is selected from the transmission or received mail folders displayed by the security setting/releasing folder list display unit, any mail in the folder is not displayed. When a transmission or received mail folder is selected from the transmission or received mail folders displayed by the folder list display unit, mail in the folder is displayed.

In accordance with a third aspect of the present invention, in the security setting/releasing unit, when the transmission mail folder is selected as an object to which security is set, all folders of the transmission mail folders are displayed by the security setting/releasing folder list display unit. In response to an indication from the user, at least one transmission mail folder is selected from the transmission mail folders as an object of the security setting and then a mark indicating an event that security is set thereto is assigned to the transmission mail folder thus selected. In the folder list display unit, the transmission mail folder to which security is set and to which a mark is assigned is not displayed in the transmission mail folder list. In the security setting/releasing unit, when the transmission mail folder is selected as an object to release security, all folders of the transmission mail folders including the transmission mail folder to which security is set and to which a mark is assigned are displayed by the security setting/releasing folder list display unit. In response to an indication from the user, a transmission mail folder is selected as an object of the security releasing and then a mark indicating that security is set in advance is removed from the transmission mail folder thus selected, and the transmission mail folder is again displayed in the transmission mail folder list.

In accordance with a fourth aspect of the present invention, in the security setting/releasing unit, when the received mail folder is selected as an object to which security is set, all folders of the received mail folders are displayed in the security setting/releasing folder list display unit. In response to an indication from the user, at least one received mail folder is selected from the received mail folders as an object of the security setting and then a mark indicating an event that security is set thereto is assigned to the received mail folder thus selected. In the folder list display unit, the received mail folder to which security is set and to which a mark is assigned is not displayed in the received mail folder list. In the security setting/releasing unit, when the received mail folder is selected as an object to release security, all folders of the received mail folders including the received mail folder to which security is set and to which a mark is assigned are displayed in the security setting/releasing folder list display unit. In response to an indication from the user, a received mail folder is selected as an object of the security releasing and then a mark indicating an event that security is set thereto is removed from the received mail folder thus selected and the received mail folder is again displayed in the received mail folder list.

In accordance with a fifth aspect of the present invention, the user stores a secret number or personal identification code for the security setting and releasing in a storage in advance. When the user selects using the security setting/releasing unit a received or transmission mail folder as an object of the security setting or releasing, the user inputs a secret number or personal identification code. Only when the secret number or personal identification code inputted by the user matches the secret number or personal identification code stored in the storage in advance, the security setting/releasing unit conducts operation thereof.

In accordance with a sixth aspect of the present invention, in the cellular phone, the user selects at least one transmission mail folder from the transmission mail folders and saves transmission mail as an object of security in the transmission mail folder selected by the user. The user selects at least one received mail folder from the received mail folders and saves received mail as an object of security in the received mail folder selected by the user.

In accordance with a seventh aspect of the present invention, there is provided a mail security processing method for a cellular phone having a mailing function. The method includes a transmission mail saving step of saving transmission mail including a piece of mail which has not been transmitted yet in a plurality of transmission mail folders, a received mail saving step of saving received mail in a plurality of received mail folders, a security setting/releasing step for a user to select whether an object to which security is set is one of the transmission mail folders or one of the received mail folders or to select whether an object from which setting of security beforehand set thereto is released is one of the transmission mail folders or one of the received mail folders, a security setting/releasing folder list display step of displaying all folders contained in the transmission or received mail folders selected in the security setting/releasing step, a security setting/releasing folder selecting step in which at least one of the folders displayed in the security setting/releasing folder list display step is selected by the user and is set as a security setting objective folder or as a security releasing objective folder, and a folder list display step of displaying the transmission mail folders or the received mail folders in the form of a list. In the method, a mark is assigned to the folder selected for the security setting in the security setting/releasing folder selecting step and the folder is displayed in the security setting/releasing folder list display step and is not displayed in the folder list display step. A mark is removed from the folder selected for the security releasing in the security setting/releasing folder selecting step and the folder is displayed in the security setting/releasing folder list display step and the folder list display step.

In accordance with an eighth aspect of the present invention, in the mail security processing method, even when a transmission or received mail folder is selected from the transmission or received mail folders displayed in the security setting/releasing folder list display step, any mail in the folder is not displayed. When a transmission or received mail folder is selected from the transmission or received mail folders displayed in the folder list display step, mail in the folder is displayed.

In accordance with a ninth aspect of the present invention, in the security setting/releasing step, when the transmission mail folder is selected as an object to which security is set, all folders of the transmission mail folders are displayed in the security setting/releasing folder list display step. In response to an indication from the user, at least one transmission mail folder is selected from the transmission mail folders as an object, of the security setting and then a mark indicating an event that security is set thereto is assigned to the transmission mail folder thus selected. In the folder list display step, the transmission mail folder to which security is set and to which a mark is assigned is not displayed in the transmission mail folder list. In the security setting/releasing step, when the transmission mail folder is selected as an object to release security, all folders of the transmission mail folders including the transmission mail folder to which security is set and to which a mark is assigned are displayed in the security setting/ releasing folder list display step. In response to an indication from the user, a transmission mail folder is selected as an object of the security releasing and then a mark indicating that security is set in advance is removed from the transmission mail folder thus selected, and the transmission mail folder is again displayed in the transmission mail folder list.

In accordance with a tenth aspect of the present invention, in the security setting/releasing step, when the received mail folder is selected as an object to which security is set, all folders of the received mail folders are displayed in the security setting/releasing folder list display step. In response to an indication from the user, at least one received mail folder is selected from the received mail folders as an object of the security setting and then a mark indicating an event that security is set thereto is assigned to the received mail folder thus selected. In the folder list display step, the received mail folder to which security is set and to which a mark is assigned is not displayed in the received mail folder list. In the security setting/releasing step, when the received mail folder is selected as an object to release security, all folders of the received mail folders including the received mail folder to which security is set and to which a mark is assigned are displayed in the security setting/releasing folder list display step. In response to an indication from the user, a received mail folder is selected as an object of the security releasing and then a mark indicating an event that security is set thereto is removed from the received mail folder thus selected, and the received mail folder is again displayed in the received mail folder list.

In accordance with an eleventh tenth aspect of the present invention, in the security processing method, the user stores a secret number for the security setting and releasing in a storage in advance. When the user selects in the security setting/releasing step a received or transmission mail folder as an object of the security setting or releasing, the user inputs a secret number. Only when the secret number inputted by the user matches the secret number stored in the storage in advance, the security setting/releasing step conducts operation thereof.

In accordance with an twelfth aspect of the present invention, in the mail security processing method, the user selects at least one transmission mail folder from the transmission mail folders and saves transmission mail as an object of security in the transmission mail folder selected by the user. The user selects at least one received mail folder from the received mail folders and saves received mail as an object of security in the received mail folder selected by the user.

In the cellular phone and the mail security processing method in accordance with the present invention, transmission mail and received mail which are desired not to be read by a third party are saved in groups of folders. Security processing is executed for the folders such that the mail folders for which the security processing has been executed are not displayed in an ordinary "transmission mail folder list" and an ordinary "received mail folder list" to improve a function to protect privacy. Thanks to the security processing executed in units of folders, the operation can be simplified.

BRIEF DESCRIPTION OF THE DRAWINGS

The objects and features of the present invention will become more apparent from the consideration of the following detailed description taken in conjunction with the accompanying drawings in which:

FIG. 2A is a diagram showing a screen image in security processing for received mail according to the embodiment of the present invention;

FIG. 2B is a diagram showing a screen image in security processing for received mail according to the embodiment of the present invention;

FIG. 2C is a diagram showing a screen image in security processing for received mail according to the embodiment of the present invention;

FIG. 2D is a diagram showing a screen image in security processing for received mail according to the embodiment of the present invention;

FIG. 3 is a flowchart showing processing to set security to received mail according to the embodiment of the present invention.

DESCRIPTION OF THE EMBODIMENTS

Referring now to the accompanying drawings, description will be given of an embodiment in accordance with the present invention.

In a cellular phone in accordance with the present invention, a mail folder to which security is set in a mail folder security setting operation is not displayed on the screen to thereby improve the privacy protecting function. That is, at least one of mail folders is set as "not to be displayed". This guarantees security of the mail stored in the mail folder.

Figure 1:
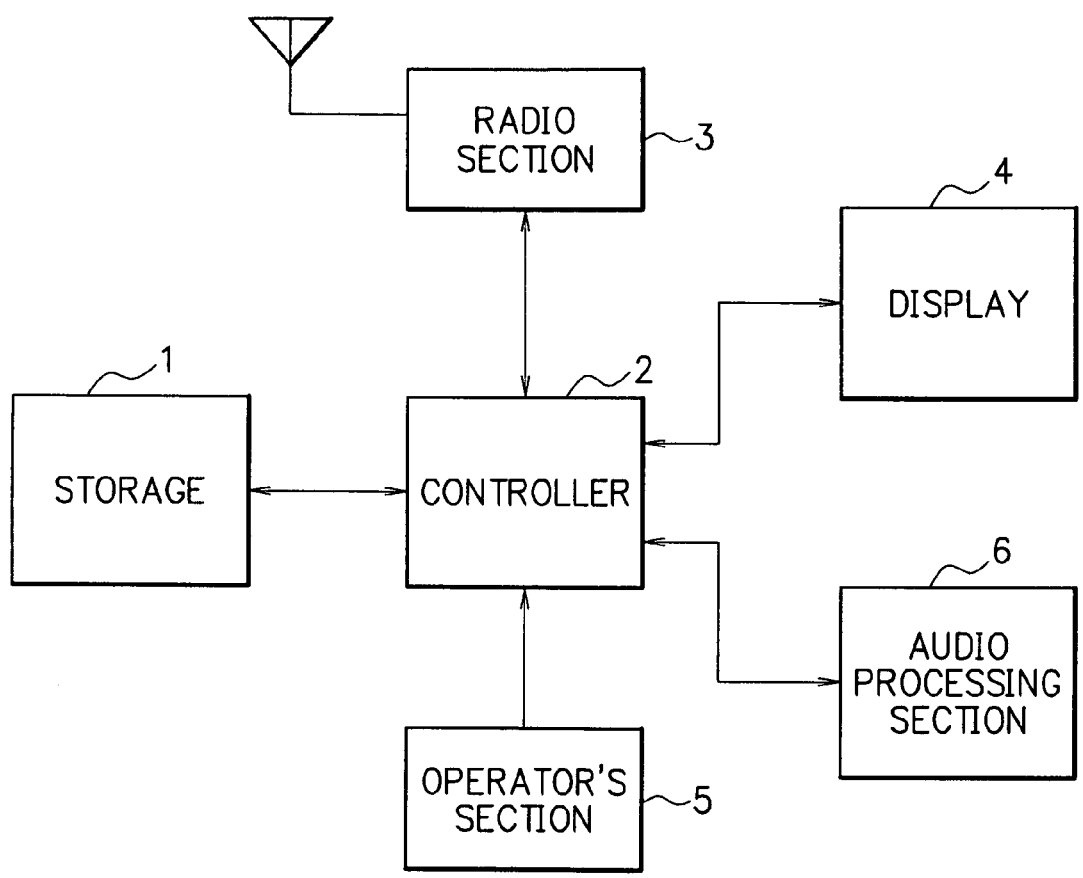
FIG. 1 is a schematic block diagram showing a configuration of a cellular phone according to an embodiment of the present invention.

FIG. 1 shows in a block diagram a configuration of an embodiment of a cellular phone in accordance with the present invention. As can be seen from FIG. 1, the cellular phone includes a storage 1, a controller 2, a radio section 3, a display 4, an operator's unit 5, and an audio processing section 6. The radio section 3, the display 4, the operator's unit 5, and the audio processing section 6 are configured in almost the same way as with those used in the conventional cellular phone. In the embodiment in accordance with the present invention, mail security processing is executed by the storage 1 and the controller 2.

The radio section 3 conducts wireless communication with a base station, not shown, via an antenna and processes wireless communication signals such as audio, video, and mail signals. The operator's unit 5 includes a plurality of keys, e.g., numeric keys, menu keys, a determination key, and a scroll key to process key operations such as a menu operation by the user. The display 4 displays various images, for example, a menu screen, a received mail image, a mail list, and mail text. The audio processing section 6 processes audio signals such as audio signals of a call and audio signals of ring tone and produces voice and sound using a speaker, not shown. The audio processing section 6 also inputs voice and sound through a microphone, not shown. The storage 1 stores a telephone number and specific information of communicated mail as well as a mail folder. The storage 1 also stores a program for the mail security processing of the present invention. The controller 2 controls, according to information inputted from the operator's unit 5, the security processing program stored in the storage 1.

The storage 1 stores transmission mail folders to keep transmission mail and received mail folders to store received mail. By specifying a transmission mail folder number and a received mail folder number according to a classification criterion set by the user, the user stores transmission mail and received mail in a transmission mail folder and a received mail folder respectively associated with the transmission and received mail folder numbers. The user also stores in the storage 1 a secret number or a personal identification number to execute mail security processing. This processing applies also to any piece of transmission mail which has not been transmitted yet only if the piece of mail is stored with a specification of a folder.

Although almost the same security processing is executed for the transmission mail and the received mail in the embodiment of the present invention, description will be first given of the security processing for the received mail.

Referring now to the drawings, description will be given of basic operation of the received-mail security processing. Assume that a piece of mail for which the security processing is desired to be executed is kept in a received folder, e.g., folder 5 in the storage 1. After the security processing is executed for folder 5, if a piece of mail is additionally saved in folder 5, the piece of mail becomes also a mail for which the security processing has been executed.

FIG. 2 shows screen images used in the security processing for received mail in accordance with the embodiment of the present invention.

As shown in FIG. 2A, the user operates the menu key to display "security setting/releasing screen" on the display 4. The user inputs a secret number equal to a secret number beforehand stored in the storage 1. The user then operates the scroll key to select a received mail folder or a transmission mail folder and determines the selected item. In this case, the user selects a received mail folder for the received-mail security processing.

When the user selects and determines a received mail folder, "security setting/releasing received mail folder list" is displayed on the display 4 as shown in FIG. 2B. To execute the security processing for received mail folder 5, the user operates the scroll key to select received mail folder 5 and then depresses the determination key. As a result, the security processing is executed for folder 5.

When the user selects an ordinary "received mail folder list" from the menu and selects folder 5, received mail stored in folder 5 is displayed. However, when the user selects folder 5 from a "security setting/releasing received mail folder list", the received mail stored in folder 5 is not displayed. In this case, any folder selected by the user is employed to set security thereto. When the selected folder is a folder to which security has been beforehand set, the folder is adopted to release the setting of security therefrom.

As a result, an asterisk (*) is indicated for folder 5 as shown in FIG. 2C. FIG. 2D shows the ordinary "received mail folder list", not the "security setting/releasing received mail folder list". After the security processing is executed for folder 5, if the user selects "received mail folder list" from the menu, folder 5 is not displayed as shown in FIG. 2D.

Therefore, when the user views the "received mail folder list" through an ordinary operation, folder 5 is not displayed. That is, the system guarantees security for the received mail stored in folder 5.

By visually checking concealed folders in the ordinary "received mail folder list", the user can visually recognize the folders for which the security processing is executed.

When the user selects a security setting/releasing screen from the menu, inputs a secret number, and selects a received mail folder to view the "security setting/releasing received mail folder list", the user can recognize any folder for which the security processing is executed. Reference is to be made to FIG. 2C. Particularly, when there exist six folders and the security processing is executed for folders 4 to 6, the "received mail folder list" includes only folders 1 to 3. Since the folders are assigned with continuous, sequence numbers, it is possible to prevent the user from misunderstanding that there exists no folder for which the security processing is executed.

To releases the setting of security processing, the user operates the menu key to display the security setting/releasing screen on the display 4. The user then inputs a secret number substantially equal to a security number beforehand stored in the storage 1. The user operates the scroll key to select a received mail folder and determines the selected item.

After the above operation is finished, the "security setting/releasing received mail folder list" with an asterisk indicated for folder 5 is presented on the display 4 as shown in FIG. 2C in which the security processing has been executed for folder 5. To release the setting of security processing from folder 5, the user operates the scroll key to select folder 5 and depresses the determination key. As a result, the setting of security for folder 5 is released or canceled. The asterisk assigned to folder 5 is accordingly removed.

To view received mail kept in folder 5, the user first releases the setting of security processing. Thereafter, the user selects the ordinary "received mail folder list" through an operation in which the user operates the menu key and selects folder 5.

Description has been given of the security processing for received mail. Security processing for transmission mail is similarly carried out. In the security setting/releasing screen, the user inputs a secret number equal to a secret number stored in the storage in advance. The user then operates the scroll key to select a transmission mail folder and determines the item thus selected. Operation after this point is almost the same as for the received-mail security processing excepting that the received mail folder is replaced by the transmission mail folder.

Referring next to the drawings, description will be given in detail of operation in the security processing for a folder. As above, the difference between the transmission-mail security processing and the received-mail security processing resides in that the user selects a transmission mail folder or a received mail folder in the security setting/releasing screen. Therefore, description will be given to the security processing for a received mail folder.

FIG. 3 shows a flowchart of the security processing for a received mail folder in accordance with the embodiment of the present invention. Referring to the flowchart, description will be given of the security processing for a received mail folder.

To execute security processing for a folder in accordance with the present invention, it is assumed that received mail for which the security processing is to be executed is beforehand saved in, for example, folder 5. It is also assumed that a secret number for the folder security processing is registered to and is kept in the storage 1.

The user first conducts operation using a menu to display the security setting/releasing screen on the display 4 (step S1). The user next inputs a secret number (step S2). The controller 2 makes a check to confirm whether or not the secret number matches the secret number beforehand saved in the storage 1 (step S3). If the secret numbers match each other (step S3, YES), the user operates the scroll key to select a received mail folder on the screen and determines the selected item (step S4). Otherwise (step S3, NO), it is not possible to select a received mail folder on the screen. Control then returns to step S2. The user inputs a secret number again. In this situation, when a predetermined period of time lapses, the screen image returns to an ordinary wait screen and the security processing is released or aborted.

After the received mail folder is selected and determined in step S4, the "security setting/releasing received mail folder list" is displayed on the screen. The user operates the scroll key to select a folder (number) to which security is to be set and then determines the pertinent item (step S5). In this case, the user selects and determines, for example, folder 5. An asterisk is indicated for the determined folder, i.e., folder 5 in this case (step S6).

When an asterisk is indicated for folder 5 on the security setting/releasing received mail folder screen in step S6, folder 5 is automatically set to be concealed, i.e., not shown on the ordinary received mail folder list (step S7).

Figure 4:
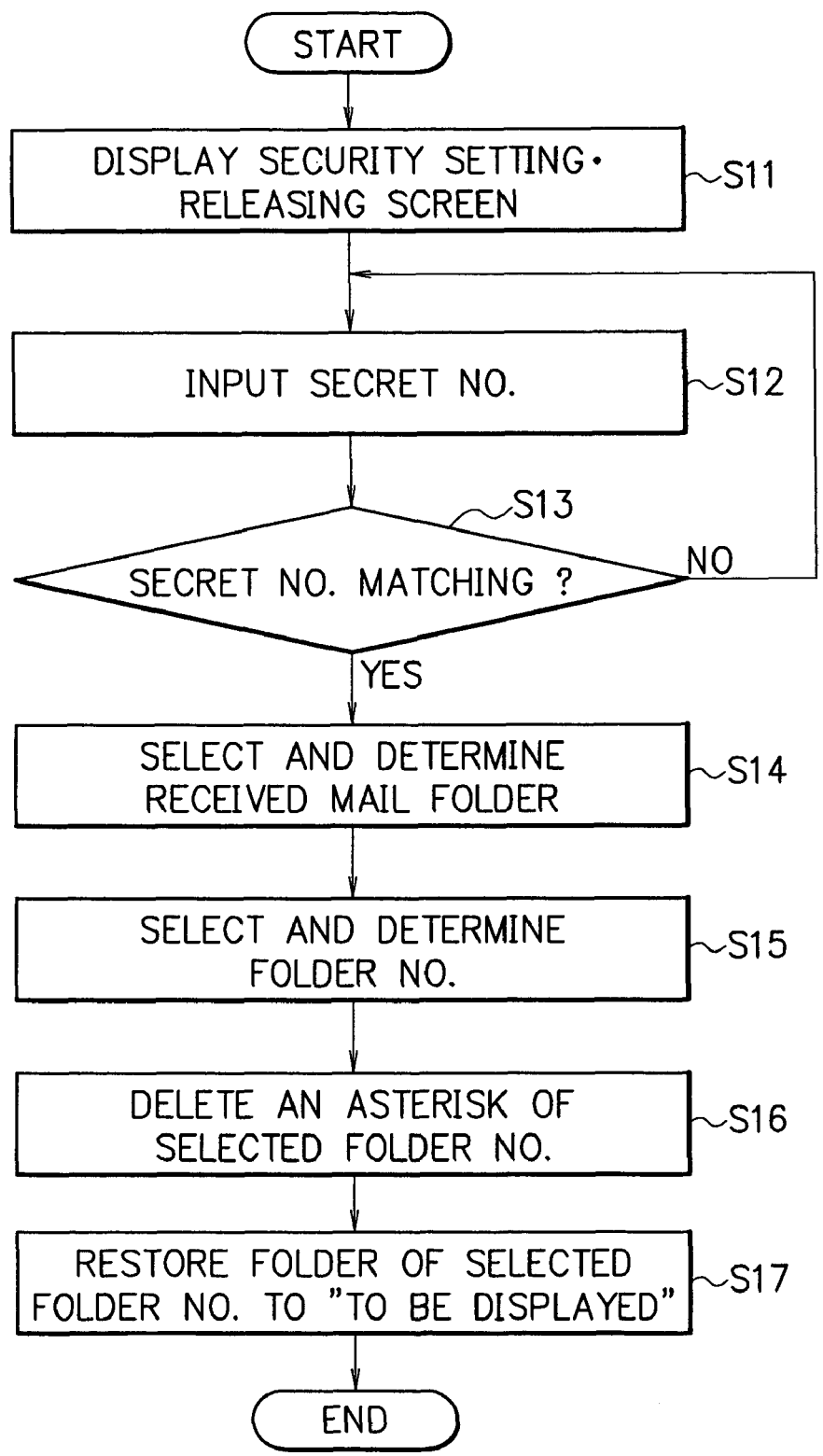
FIG. 4 is a flowchart showing processing to release the setting of security from the received mail according to the embodiment of the present invention.

Description will next be given of received mail folder security releasing processing. FIG. 4 shows, in a flowchart, processing to release the setting of security from a received mail folder in accordance with the embodiment of the present invention. The security releasing processing will be described by referring to FIG. 4.

First, the user conducts operation on a menu to display a security setting/releasing screen on the display 4 (step S11). The user then inputs a secret number (step S12). The controller 2 confirms whether or not the secret number matches the secret number beforehand stored in the storage 1 (step S13). If the secret numbers match each other (step S13, YES), the user selects by the scroll key a received mail folder on the screen and then determines the selected item (step S14). If the secret numbers are different from each other (step S13, NO), it is not possible to select a received mail folder on the screen. Control returns to step S12, and the user inputs a secret number again. In this state, when a predetermined period of time lapses, the screen image returns to an ordinary wait screen and the security processing is aborted.

When the received mail folder is selected and determined in step S14, the "security setting/releasing received mail folder list" is displayed on the screen. The user operates the scroll key to select a folder (number) for which security is to be released and then determines the item thus selected (step S15). Assume in this case, for example, folder 5 is a folder to which security has been set. That is, an asterisk has been indicated for folder 5, and hence the user can confirm on the screen which one of the folders is a folder for which security has been set. For the determined folder, namely, folder 5 in this case, the asterisk is removed (step S16).

When the asterisk of folder 5 is removed from the screen of the security setting/releasing received mail folder list, folder 5 is automatically displayed again on the ordinary received mail folder list (step S17).

Description has been given of the security processing for a received mail folder. In an operation to set security to a transmission mail folder, when a transmission mail folder is selected in the security setting/releasing screen, the security setting/releasing transmission mail folder list is displayed on the display 4. When the user selects a folder number in step S5, the security setting is conducted for the transmission mail folder number. As a result, the transmission mail folder number to which security is set as above is not displayed in the ordinary transmission mail folder list.

In an operation to release the setting of security from a transmission mail folder, when the user selects and determines a transmission mail folder in the security setting/releasing screen, the security setting/releasing transmission mail folder list is displayed on the display 4. When the user selects in step S5 a folder number to which security is beforehand set, the security releasing operation is conducted for the transmission mail folder number. Resultantly, the transmission mail folder number is again displayed in the ordinary transmission mail folder list.

The user selects the security setting/releasing screen in the description. However, in consideration of protection of privacy, the name of the screen may be changed to, for example, "security".

In accordance with the embodiment of the present invention, the transmission mail and the received mail which are desired not to be read by a third party are saved in folders. The security processing is executed for the folders such that the folders are not displayed in the ordinary transmission mail folder list and the received mail folder list to thereby improve the privacy protecting function.

Next, description will be given of another embodiment in accordance with the present invention. In the description, the user selects a received mail folder or a transmission mail folder in the security setting/releasing screen to display the security setting/releasing received (transmission) mail folder list on the display 4. However, it is also possible to provide a security setting/releasing received (transmission) mail list. The user selects a piece of received or transmission mail in the security setting/releasing screen to display the security setting/releasing received (transmission) mail list to conduct the security setting and releasing for each piece of mail. In this regard, the security setting and releasing can be conducted for any piece of mail which has not been transmitted and which has been saved in the transmission mail list. This is similar to the operation described above for the piece of mail saved in the transmission mail folder. That is, the security processing is conducted for any piece of mail which has not been transmitted and which has been saved in the transmission mail folder.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A cellular phone having a mailing function, the cellular phone comprising:

a plurality of transmission mail folders for saving transmission mail including a piece of mail which has not been transmitted yet;

a plurality of received mail folders for saving received mail;

security setting/releasing means, implemented on a computer readable medium, for a user to select whether an object to which security is set is one of the transmission mail folders or one of the received mail folders or to select whether an object from which setting of security beforehand set thereto is released is one of the transmission mail folders or one of the received mail folders;

security setting/releasing folder list display means, implemented on a computer readable medium, for displaying all folders contained in the transmission or received mail folders selected by the security setting/releasing means;

security setting/releasing folder selecting means, implemented on a computer readable medium, in which at least one of the folders displayed by the security setting/releasing folder list display means is selected by the user and is set as a security setting objective folder or as a security releasing objective folder; and folder list display means, implemented on a computer readable medium, for displaying the transmission mail folders or the received mail folders in the form of a list, wherein a mark is assigned to the folder selected for the security setting by the security setting/releasing folder selecting means and the folder is displayed by the security setting/releasing folder list display means and is not displayed by the folder list display means, a mark is removed from the folder selected for the security releasing by the security setting/releasing folder selecting means and the folder is displayed by the security setting/releasing folder list display means and the folder list display means, the user stores a secret number for the security setting and releasing in a storage in advance, and when the user selects, using the security setting/releasing means, a received or transmission mail folder as an object of the security setting or releasing, the user inputs a secret number, and only when the secret number inputted by the user matches the secret number stored in the storage in advance, the security setting/releasing means conducts operation thereof.

* * * * *